US 8,825,221 B2

(12) United States Patent
Hüger et al.

(10) Patent No.: US 8,825,221 B2
(45) Date of Patent: Sep. 2, 2014

(54) METHOD AND DEVICE FOR ASSISTING PARKING OF A MOTOR VEHICLE

(75) Inventors: Philipp Hüger, Rühen (DE); Frank Schwitters, Königslutter (DE)

(73) Assignee: Volkswagen AG, Wolfsburg (DE)

( * ) Notice: Subject to any disclaimer, the term of this patent is extended or adjusted under 35 U.S.C. 154(b) by 161 days.

(21) Appl. No.: 13/700,848

(22) PCT Filed: May 30, 2011

(86) PCT No.: PCT/EP2011/002656
§ 371 (c)(1),
(2), (4) Date: Nov. 29, 2012

(87) PCT Pub. No.: WO2011/151045
PCT Pub. Date: Dec. 8, 2011

(65) Prior Publication Data
US 2013/0073119 A1    Mar. 21, 2013

(30) Foreign Application Priority Data

Jun. 4, 2010 (DE) .......................... 10 2010 022 716
Jun. 4, 2010 (DE) .......................... 10 2010 022 718

(51) Int. Cl.
*G06F 17/00* (2006.01)
*B62D 15/02* (2006.01)

(52) U.S. Cl.
CPC .................................... *B62D 15/027* (2013.01)
USPC ................................... 701/1; 701/41; 715/835

(58) Field of Classification Search
USPC ........................................ 701/1, 41; 715/835
See application file for complete search history.

(56) References Cited

U.S. PATENT DOCUMENTS

| | | | |
|---|---|---|---|
| 6,424,895 B1 | 7/2002 | Shimizu et al. | |
| 6,971,070 B2 * | 11/2005 | Obradovich | 715/835 |
| 7,519,922 B2 * | 4/2009 | Obradovich | 715/833 |
| 2007/0088478 A1 * | 4/2007 | Mori et al. | 701/41 |
| 2009/0259365 A1 | 10/2009 | Rohlfs et al. | |

FOREIGN PATENT DOCUMENTS

| | | |
|---|---|---|
| DE | 10045616 A1 | 3/2002 |
| DE | 102006061597 A1 | 7/2007 |
| DE | 102006026092 A1 | 12/2007 |
| DE | 102007029773 A1 | 12/2008 |

(Continued)

OTHER PUBLICATIONS

International Preliminary Report on Patentability for International Patent Application No. PCT/EP2011/002656; Dec. 4, 2012.

(Continued)

*Primary Examiner* — Mary Cheung
*Assistant Examiner* — Michael Berns
(74) *Attorney, Agent, or Firm* — Barnes & Thornburg LLP

(57) ABSTRACT

A method and device for selecting a parking assistance function from a predefined group of parking assistance functions of a parking steering assistant by an input element of the parking steering assistant of a motor vehicle. The parking assistance functions are arranged in two groups, wherein the first group includes the functions which relate to parking of the vehicle and the second group includes functions which relate to exiting a parking space by the vehicle. A selection is made between the two function groups as a function of the ignition switch state and a distance traveled by the vehicle, as a result of which the method differentiates automatically between parking functions and parking space exiting functions.

20 Claims, 10 Drawing Sheets

(56) References Cited

FOREIGN PATENT DOCUMENTS

| EP | 1510440 A2 | 3/2005 |
| JP | 2003175852 A | 6/2003 |
| WO | 2008055567 A1 | 5/2008 |

OTHER PUBLICATIONS

Search Report for German Patent Application No. 10 2010 022 716.1; Aug. 21, 2013.
Search Report for International Patent Application No. PCT/EP2011/002656; Oct. 5, 2011.

* cited by examiner

METHOD AND DEVICE FOR ASSISTING PARKING OF A MOTOR VEHICLE

PRIORITY CLAIM

This patent application is a U.S. National Phase of International Patent Application No. PCT/EP2011/002656, filed 30 May 2011, which claims priority to German Patent Application No. 10 2010 022 718.8, filed 4 Jun. 2010, and German Patent Application No. 10 2010 022 716.1, filed 4 Jun. 2010, the disclosures of which are incorporated herein by reference in their entirety.

FIELD

Disclosed embodiments relate to a method for assisted parking of a motor vehicle as claimed in the preamble of claim 1, and to a parking steering assistant as claimed in the preamble of claim 9.

Modern motor vehicles are increasingly being fitted with convenience and assistance systems which make it easier for the driver to drive the vehicle and/or increase the reliability of driving a vehicle. Assistance systems of this kind include parking assistance systems which assist the driver when driving a vehicle into parking spaces or driving a vehicle out of parking spaces which can be oriented parallel or transverse to the carriageway. In this case, the relatively long edge of a parking space which is essentially assumed to be rectangular is critical for classifying the parking space as a parallel parking space or a bay parking space. The parking assistance systems comprise a sensor system with which the area surrounding the motor vehicle is searched for obstacles and/or free areas. If a parking space is identified in a free area, the system provides the driver with instructions as to how he should drive the vehicle into the parking space or drive the vehicle out of the parking space. This can go so far that the assistance system controls individual vehicle systems or all the vehicle systems required for driving into a parking space or driving out of a parking space.

BACKGROUND

WO 2008/055567 discloses a parking steering assistance system having at least one sensor for detecting obstacles and/or free areas in an environment transverse to the longitudinal direction of the motor vehicle, an evaluation and control system for evaluating the sensor signals and controlling vehicle systems in order to drive into a parking space without any steering intervention by the driver in an activated automatic parking mode of the motor vehicle, it being possible for the automatic parking mode to be activated by means of detecting actions of the driver without confirmation by the driver in respect of a parking proposal. However, this activation of the automatic parking mode without confirmation by the driver reliably presupposes that an area which is to be driven over in order to park has been identified as being free of obstacles taking into consideration safety distances and tolerances. If this is not the case, a corresponding driver input, that is to say confirmation of the parking proposal, has to be performed before activation of the automatic parking mode.

Furthermore, DE 10 2006 026 092 A1 discloses a method for controlling a parking process which is to carried out at least partially automatically and by means of which a motor vehicle is moved from an actual position to a desired position. In this case, an image of the environment of the motor vehicle and a virtual target object in the environment are displayed by a display unit in the interior of the motor vehicle. The image position of the target object is changed as a function of operator control actions by the driver and, as a result, the desired position of the motor vehicle is changed and the parking process is correspondingly adapted.

Furthermore, DE 100 45 616 A1 describes a method for automatically parking a motor vehicle in a parking space, in which method the area surrounding the sides of a motor vehicle is displayed in plan view by means of a video camera and the driver selects the desired parking space by means of a touch screen.

SUMMARY

One disadvantage of the known method is that the operator control surface is often not sufficiently ergonomically designed for interaction between the driver and the driver assistance system. Furthermore, the complexity of the operator control surface is too high for interaction between the driver and the driver assistance system.

Therefore, the disclosed embodiments improve the ergonomics of a parking assistant for assisted parking of a motor vehicle and simplify operator control of the parking assistant for assisting the processes of driving a motor vehicle into a parking space and driving a motor vehicle out of a parking space.

BRIEF DESCRIPTION OF THE DRAWINGS

Disclosed embodiments will be explained below with reference to the drawings.

DETAILED DESCRIPTION OF THE DISCLOSED EMBODIMENTS

Figure 1:
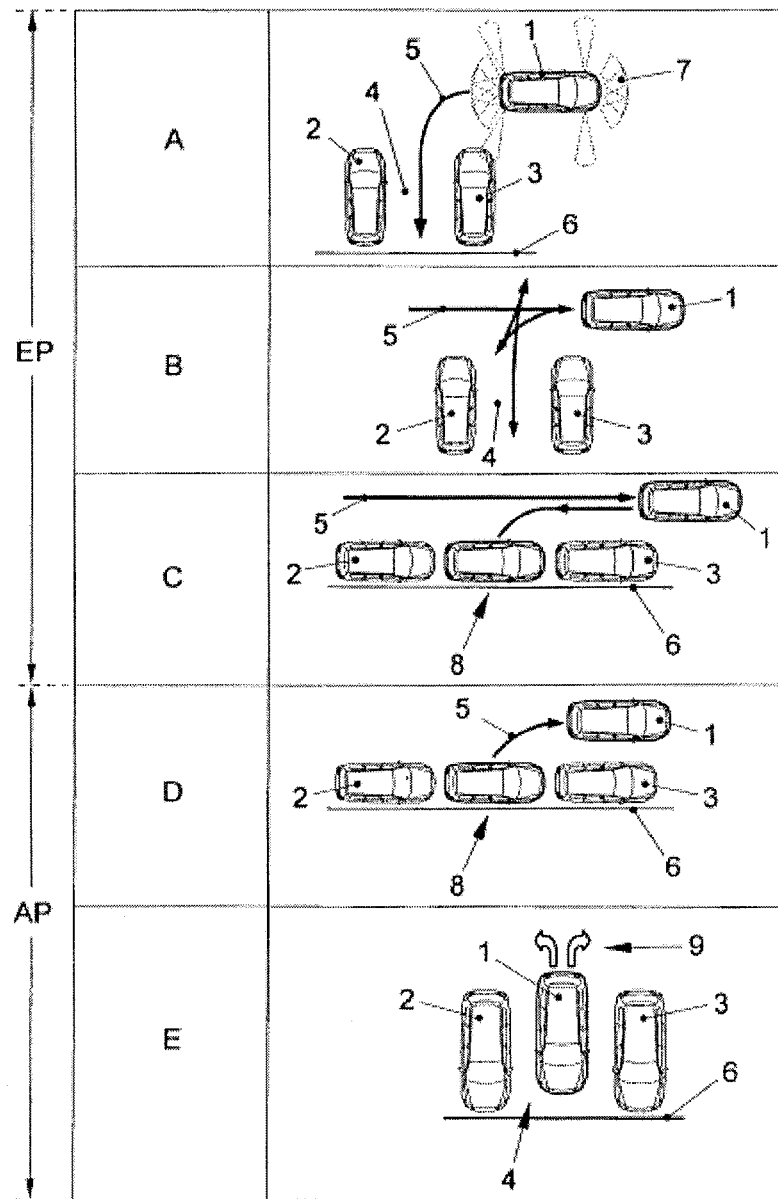
FIG. 1 is an illustration of the groups of functions and the assistance functions in table form.

In at least one embodiment of the method for selecting a parking assistance function from amongst a predefined large number of parking assistance functions of a parking steering assistant by means of an input element of the parking steering assistant and the driving direction indicator of a motor vehicle, the parking assistance functions are arranged in two groups. The first group comprises functions which relate to the vehicle driving into a parking space, and the second group comprises the functions which relate to the vehicle driving out of a parking space. A choice is made between the two groups of functions as a function of the ignition switch state and the distance s covered by the motor vehicle. In other words, the method automatically distinguishes between functions for driving into a parking space and functions for driving out of a parking space. Furthermore, the motor vehicle has a sensor system for determining the area surrounding the motor vehicle.

The first group of functions may be selected when the ignition switch is in the "on" state and a distance s greater than a predefined threshold a (s>a) has been covered after the ignition switch state "on". The second group of functions is selected when the ignition switch is in the "on" state and a distance s of less than or equal to the predefined threshold a (s≤a) has been covered after the ignition switch state "on". The predefined threshold can be, for example, 5 m or less, so that the parking steering assistant automatically selects the second group of functions, "driving out of a parking space", after the ignition is switched on and a distance of less than 5 m. In the extreme case, the predefined threshold can be set to the value zero.

After the respective group of functions has been selected, the parking assistance functions of a group may be selected in a predefined order by means of the input element.

The direction of driving into a parking space or driving out of a parking space may be established by the driving direction indicator. In this case, the driver assistance function can be activated, for example, by selecting the forward or reverse gear.

The first group of functions may comprise the functions of "driving forward into a bay parking space", "reversing into a bay parking space" and also "reversing into a parallel parking space", and the second group of functions may comprise the functions of "driving out of a parallel parking space" and "driving out of a bay parking space".

Furthermore, the current driver assistance function and subsequently the execution of a selected driver assistance function can be symbolically displayed on a display unit.

In a further disclosed embodiment, parking spaces in the area surrounding the motor vehicle are determined and classified into parallel parking spaces and bay parking spaces, and a parking assistance function is selected from amongst the determined group of functions of the parking assistance functions as a function of the classified parking space. In this way, the suitable function for driving into a parking space or driving out of a parking space can be automatically provided, this making parking significantly easier for the driver. In other words, the ergonomics of operator control of a parking steering assistant are considerably improved and therefore operator control of a parking steering assistant is substantially self-explanatory.

Furthermore, the direction of driving into a parking space or driving out of a parking space is established by the classified parking space and/or is established by the driving direction indicator. It is also possible, for example, to establish the direction of driving into a parking space on the passenger side, that is to say on the right-hand side when driving on the right-hand side, as a preset (default value), it then being possible to overrule this by the turn signal as an authority with a higher priority. By way of this measure, automation of the parking steering assistant is further increased and therefore operator control of the parking assistant by the driver is further simplified.

A parking steering assistant for carrying out the method described above comprises a surrounding area sensor system for determining the area surrounding a motor vehicle, an evaluation unit for determining parking spaces in the area surrounding the motor vehicle, a control unit for controlling the parking assistance functions in respect of driving into a parking space and driving out of a parking space, and an input element for activating the parking steering assistant and selecting its functions, with the parking steering assistant having a selection device which makes a selection between two groups of functions of the parking steering assistant as a function of the ignition switch state and the distance covered by the motor vehicle, with the first group of functions relating to functions for driving into a parking space and the second group of functions relating to functions for driving out of a parking space.

The selection device may select the first group of functions when the ignition switch is in the "on" state and a distance s of greater than a predefined threshold a (s>a) has been covered after the ignition switch state "on", and the second group of functions is selected when the ignition switch is in the "on" state and a distance s of less than or equal to the predefined threshold a (s≤a) has been covered after the ignition switch state "on".

In particular, the first group of functions can comprise the functions of "driving forward into a bay parking space", "reversing into a bay parking space" and also "reversing into a parallel parking space", and the second group of functions can comprise the functions of "driving out of a parallel parking space" and "driving out of a bay parking space".

The evaluation unit may determine and classify parking spaces in the area surrounding the motor vehicle, with the selection device selecting a parking assistance function from amongst the selected group of functions as a function of the classified parking space. By virtue of these measures, the suitable function for driving into a parking space or driving out of a parking space can be automatically provided, this making parking significantly easier for the driver.

FIG. 1 shows an overview of the assistance functions A-E of a parking steering assistant in the form of a table, with the assistance functions A-E being subdivided into two groups of functions, specifically the group of functions EP for driving into a parking space and the group of functions AP for driving out of a parking space.

The group of functions EP for driving into a parking space comprises function A—driving forward into a bay parking space, function B—reversing into a bay parking space, and function C—reversing into a parallel parking space.

The second group of functions AP for driving out of a parking space comprises function D—driving out of a parallel parking space, and function E—reversing out of a bay parking space.

In this case, functions A-E which are illustrated in the table in FIG. 1 are each explained by an image, with the images being substantially self-explanatory.

The illustration of function A shows a vehicle 1 in question which drives forward into a bay parking space 4, which is formed between two vehicles 2, 3, along a path 5, with the bay parking space 4 being delimited at the rear, for example, by a curb 6. The sensor system 7 which senses the area surrounding the vehicle 1 in question is also schematically illustrated.

The illustration of function B shows a vehicle 1 in question reversing into a bay parking space 4, with the bay parking space being delimited to the left and right by other parked vehicles 2 and 3. The path 5 driven by the vehicle 1 in question is a three-maneuver path in the illustrated case, that is to say comprises a first reverse movement, followed by a forward movement and then the final reverse movement into the bay parking space 4.

The illustration of function C shows a vehicle 1 in question reversing into a parallel parking space 8, with the parallel parking space being delimited by two vehicles 2, 3. The path 5 driven by the vehicle 1 in question is generally a multiple-maneuver parking process since the vehicle 1 in question often has to maneuver forward and backward within the parallel parking space 8, depending on the length of the parallel parking space 8, in order to orient the vehicle 1 in question.

Function D which is assigned to the second group of functions AP "driving out of a parking space" shows how a vehicle 1 in question is driven out of a parallel parking space 8 which is arranged between two vehicles 2, 3 and has, on that side which is averted from the carriageway, a boundary, for example in the form of a curb 6. The path 5 for driving out of the parking space can be a multiple-maneuver path within the parking space, depending on the length of the parallel parking space 8.

The illustration of function E for driving out of a parking space shows how a vehicle 1 in question reverses out of a bay parking space 4 which is delimited by two vehicles 2, 3 and has, at the end, a curb 6 as a boundary. In this case, the vehicle 1 in question can reverse out of the bay parking space 4 in two directions, this being symbolized by reference sign 9.

Figure 2:
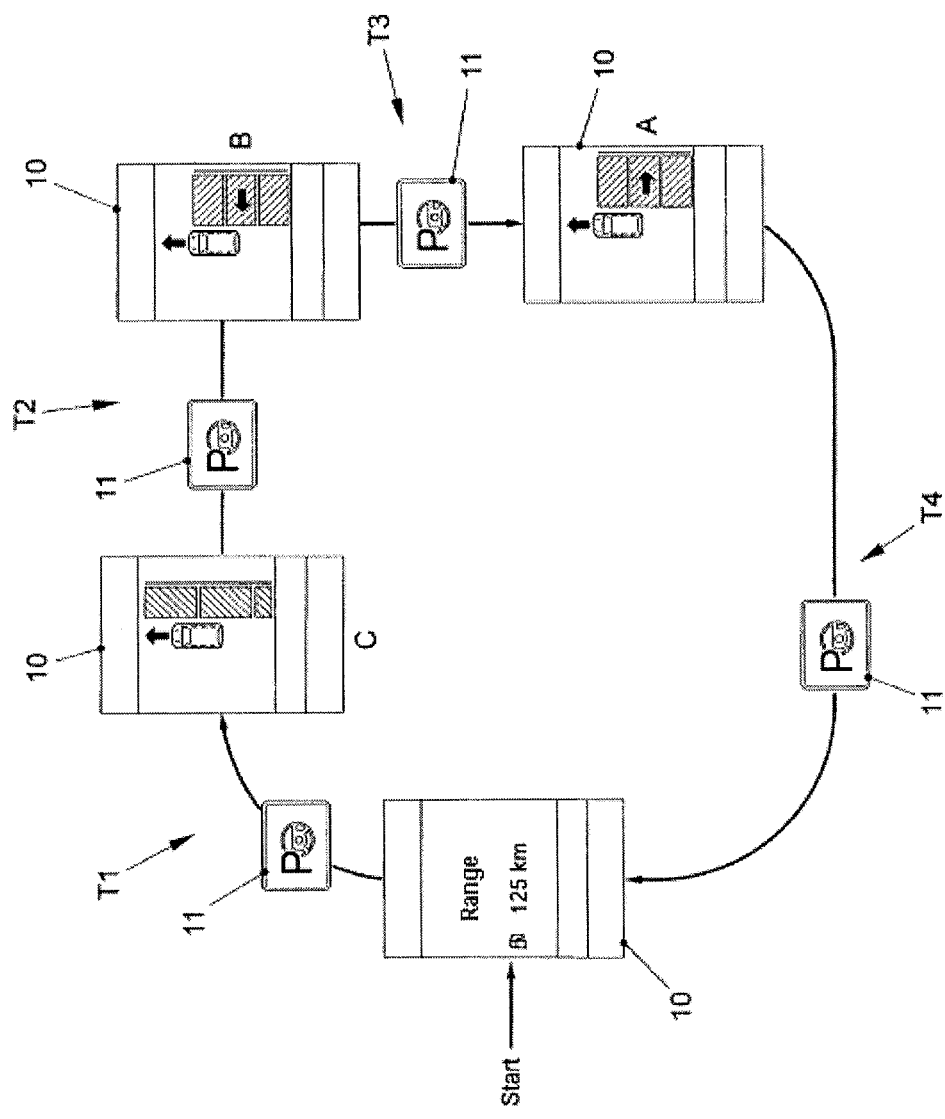
FIG. 2 is a schematic illustration of the sequence of selecting the functions of the first group of functions (driving into a parking space using an HMI), [HMI=Human-Machine Interface]

FIG. 2 shows the sequence of the first group of functions EP "driving into a parking space", with the functions A, B and C which are described in FIG. 1 being selected by the driver by virtue of the HMI sequence which is illustrated in FIG. 2. The starting point is the display unit 10 which is identified by "Start" and which is currently displaying, by way of example, a gas pump symbol with a remaining range of 125 km. Assuming that a distance s of greater than a predefined threshold, for example 5m, was covered after the ignition was switched on, that is to say terminal 15=on, the assistance system preselects a group of functions and limits the selection to the group of functions for driving into a parking space. A first operation T1 of the parking steering assistant button 11 therefore has the effect of providing function C "reversing into a parallel parking space", this triggering a display of a corresponding symbol on the display unit 10. A second operation of T2 of the parking steering assistant button 10 has the effect of providing function B for "reversing into a bay parking space" with a corresponding symbolic display on the display unit 10. A third operation T3 of the parking steering assistant button 10 has the effect of providing the last parking function C "driving forward into a bay parking space" of the first group of functions. If the driver decides not to select any function for driving into a parking space, further operation of the parking steering assistant button 10 resets the system to the basic state, that is to say the assistance system terminates the HMI sequence in respect of the first group of functions, and the system, as it were, returns to the starting point "Start". The arrangement of the functions for driving into a parking space in the order C-B-A is not compulsory. Provision may be made, by way of example, for the driver to arrange the order as desired. Furthermore, the side on which the parking space is searched for can be selected by means of the driving direction indicator of the vehicle, that is to say the turn signal.

Figure 3:
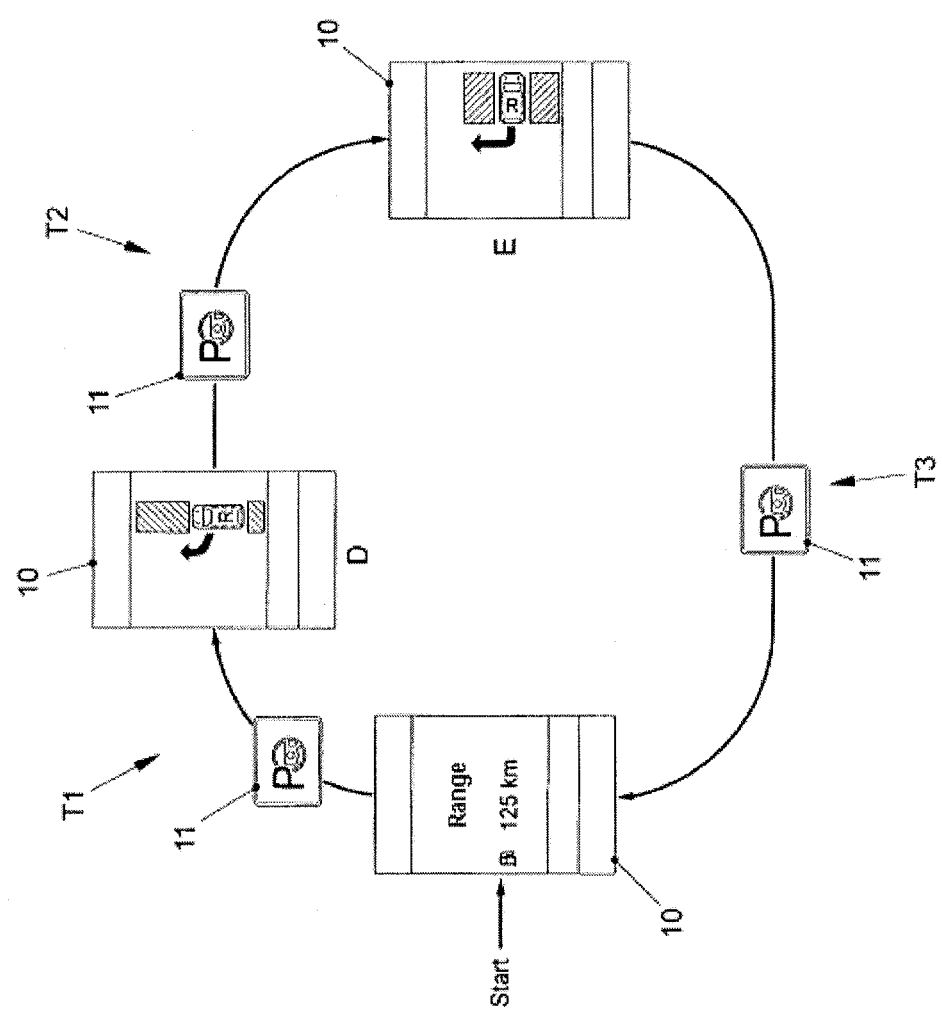
FIG. 3 is a schematic illustration of the sequence of selecting the functions of the second group of functions (driving out of a parking space using an HMI)

FIG. 3 shows the sequence of the second group of functions AP "driving out of a parking space", with functions D and E for driving out of a parking space which are described in FIG. 1 being selected by the HMI sequence illustrated in FIG. 3 by the driver. The starting point is the display unit 10 which is identified by "Start" and which is currently displaying, by way of example, a gas pump symbol with a remaining range of 125 km. Assuming that at most a distance s of less than or equal to a predefined threshold was covered after the ignition was switched on, that is to say terminal 15=on, the assistance system preselects a group of functions and limits the selection to functions D and E for driving out of a parking space of the second group of functions AP. A first operation T1 of the parking steering assistant button 11 therefore has the effect of providing function D "driving forward out of a parallel parking space", this triggering a display of a corresponding symbol on the display unit 10. A second operation T2 of the parking steering assistant button 10 has the effect of providing function E "reversing out of a bay parking space" with a corresponding symbolic display on the display unit 10. A third operation T3 of the parking steering assistant button 10 has the effect of resetting the system to the starting state, that is to say the system returns to the state identified by "Start". The side on which the parking space is searched for is selected by means of the driving direction indicator of the vehicle, that is to say the turn signal, in the case of driving out of a parking space too.

Figure 4:
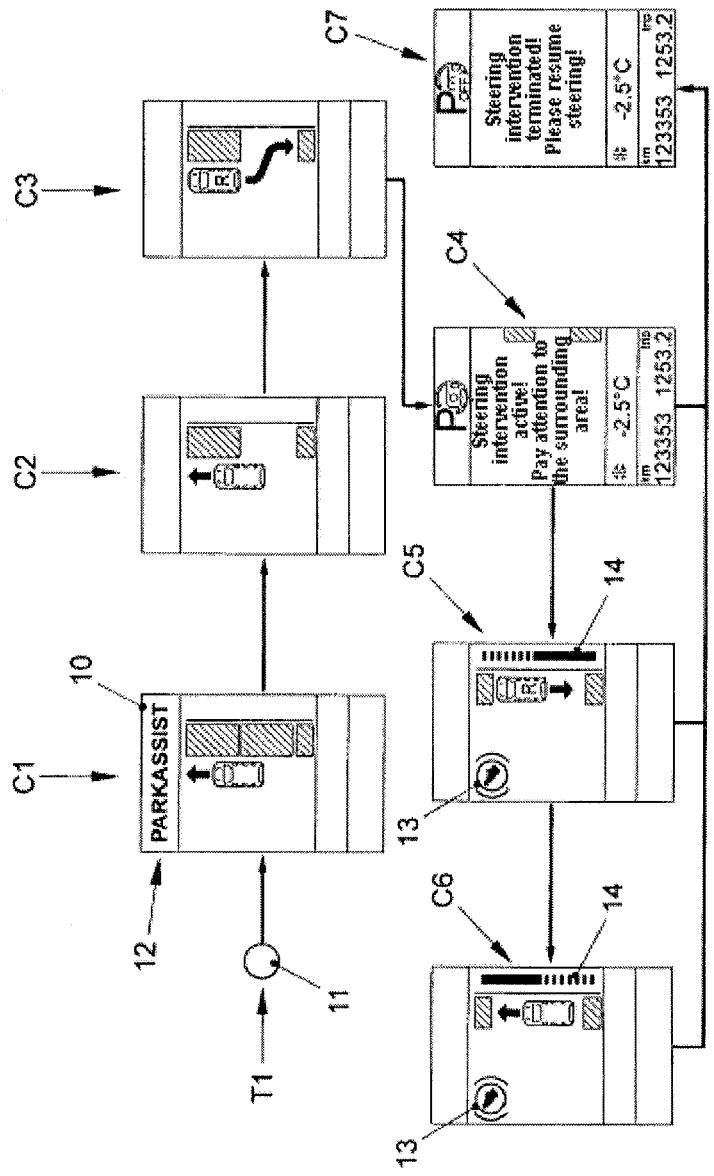
FIG. 4 is an illustration of the sequence of a multiple-maneuver process for driving into a parallel parking space.

FIG. 4 shows the sequence of assistance function C "reversing into a parallel parking space" in detail with reference to steps C1 to C7. After the driver performs a first operation T1 of the parking steering assistance button 11, a check is made to determine whether a distance s of greater than the abovementioned predefined threshold has been covered since the ignition was switched on, terminal 15=on. If this is the case, the caption "Park Assist" is shown on the display unit in a first step C1 for a predefined period of time, for example 5 seconds, in order to inform the driver that the parking assistant is active. Furthermore, a closed row of vehicles parked in parallel parking spaces is displayed on the right-hand driving side in the first step C1, as a result of which the side on which a parking space is searched for and the type of parking space are established and disclosed to the driver. The side on which a parking space is searched for is established by means of the driving direction turn signal, that is to say the driver has to operate the turn signal before or after operation of the parking steering assistant button 11 in order to inform the system of the side on which he wishes to park. It is also possible for parking on the right-hand side to be established as a preset, so that it is only necessary to operate the turn signal if the driver wishes to park on the left-hand side.

If the system finds a suitable parking space as the vehicle in question passes by at a maximum speed of 40 km/h with a distance from the row of the parking lane of from 0.5 to 1.5 m, this is displayed on the display unit 10 in step C2. Since the vehicle in question has to be in a suitable starting position for assisted or automatic driving into a parking space, the situation of this starting position being reached is indicated to the driver in a third step C3. In other words, once the driver has found a suitable parking position by suitably driving the vehicle along the parallel parking space, the display on the display unit changes to that shown in step C3.

In order to be able to initiate and carry out the process for reversing into a parking space, the driver then engages the reverse gear in the fourth step C4 and the display on the display unit 10 informs the driver that the system is performing an active steering intervention and the driver should pay attention to the surrounding area. Then, in a fifth step C5, the driver is requested to apply the brake by the braking foot 13 being shown after the display of the required change in driving direction, with the wheels being positioned while the vehicle is stationary. Furthermore, the progress of the parking maneuver is displayed by means of a bar graph 14 with, for example, 16 stages. If the vehicle is already in an acceptable parking position, this is displayed to the driver in the seventh step C7 and the parking steering assistance process is terminated. In other words, the driver is requested to resume steering.

If the parking position of the vehicle in question in the parking space is not acceptable, for example because it is not at a sufficient distance from the vehicle behind it, the driver is requested to apply the brake by the braking foot 13 being shown in the sixth step C6, while the system moves the wheels into the corresponding position. The driver then engages the forward gear in order to orient the vehicle in the parking space. If the vehicle is correctly oriented, the system terminates the process for driving into a parking space in the seventh step C7 by the display unit 10 indicating to the driver that he should take hold of the steering wheel again.

Figure 5:
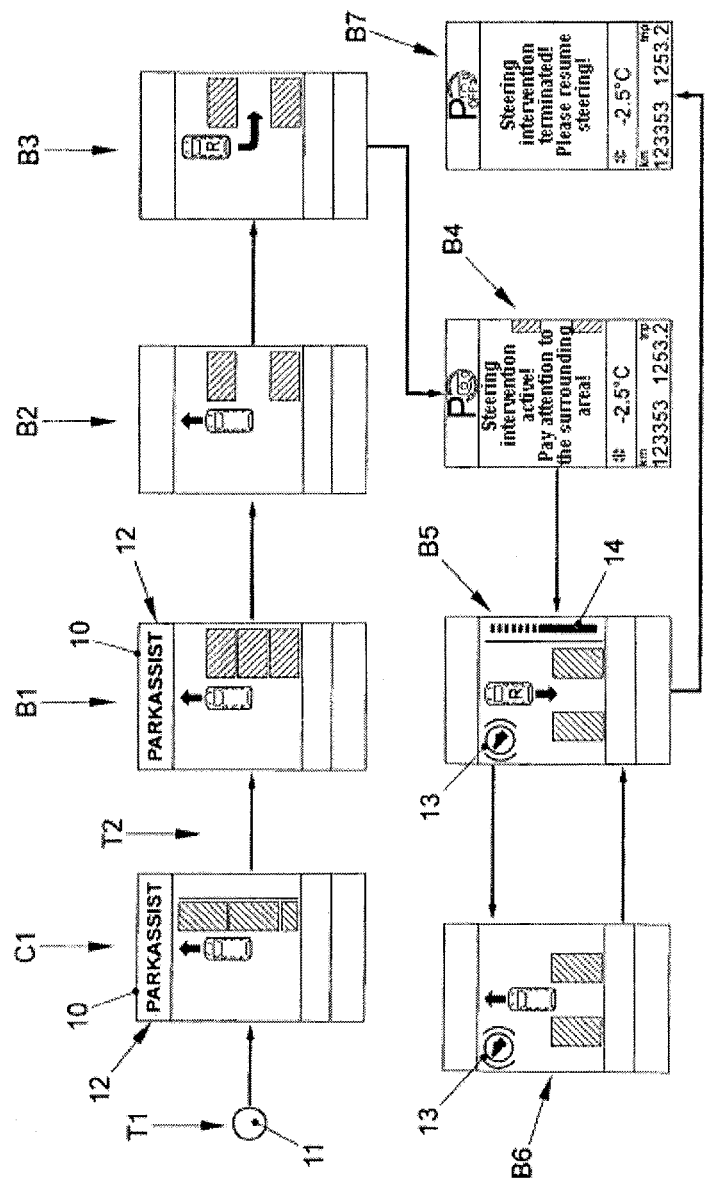
FIG. 5 is an illustration of the sequence of a multiple-maneuver process for driving into a bay parking space.

FIG. 5 shows the sequence of assistance function B "reversing into a bay parking space" in detail with reference to steps B1 to B7. After the driver executes a first operation T1 of the parking steering assistant button 11, the caption "Park Assist" is shown on the display unit in a first step C1 for a predefined period of time, for example 5 seconds, in order to inform the driver that the parking assistant is active and that function C for driving into a parking space is active. A further operation T2 of the parking steering assistant button 11 changes over the system to function B for driving into a parking space "reversing into a bay parking space", this being displayed on the display unit in step B1 by suitable display of a row of bay parking spaces on the right-hand side. In this case, the side on which the driver intends to park is optionally established by operating the turn signal. Furthermore, the activity of the parking steering assistant [=parking assistant] is illustrated to the driver by the item of information 12 "Park Assist" being shown on the display unit.

If the system finds a suitable bay parking space as the vehicle in question passes by, this is displayed on the display unit 10 in step B2. Since the vehicle in question has to be in a suitable starting position for assisted or automatic driving into a parking space, the situation of this starting position being reached is indicated to the driver in a third step B3. In other words, once the driver has found a suitable parking position by suitably driving the vehicle along the bay parking space, the display on the display unit changes to that shown in step B3.

In order to be able to initiate and carry out the process for reversing into a parking space, the driver now engages the reverse gear in the fourth step B4 and the display on the display unit 10 informs the driver that the system is performing an active steering intervention and the driver should pay attention to the surrounding area. Then, in a fifth step B5, the driver is requested to apply the brake by the braking foot 13 being shown after a minimum distance is covered, with the wheels being positioned while the vehicle is stationary. Furthermore, the progress of the parking maneuver is displayed by means of a bar graph 14 with, for example, 16 stages. If the vehicle is already in an acceptable parking position, this is displayed to the driver in the seventh step B7 and the parking steering assistance process is terminated. In other words, the driver is requested to resume steering.

If the parking position of the vehicle in question in the parking space is not acceptable, the driver is requested to apply the brake by the braking foot 13 being shown in the sixth step B6, while the system moves the wheels into the corresponding position. The driver then engages the forward gear in order to orient the vehicle. If the vehicle is correctly oriented, engaging the reverse gear returns the systems to step B5. If the position of the vehicle in the bay parking space is then correct, the system terminates the process for driving into a parking space in the seventh step B7 with the instruction to the driver on the display unit 10 to take hold of the steering wheel again.

Figure 6:
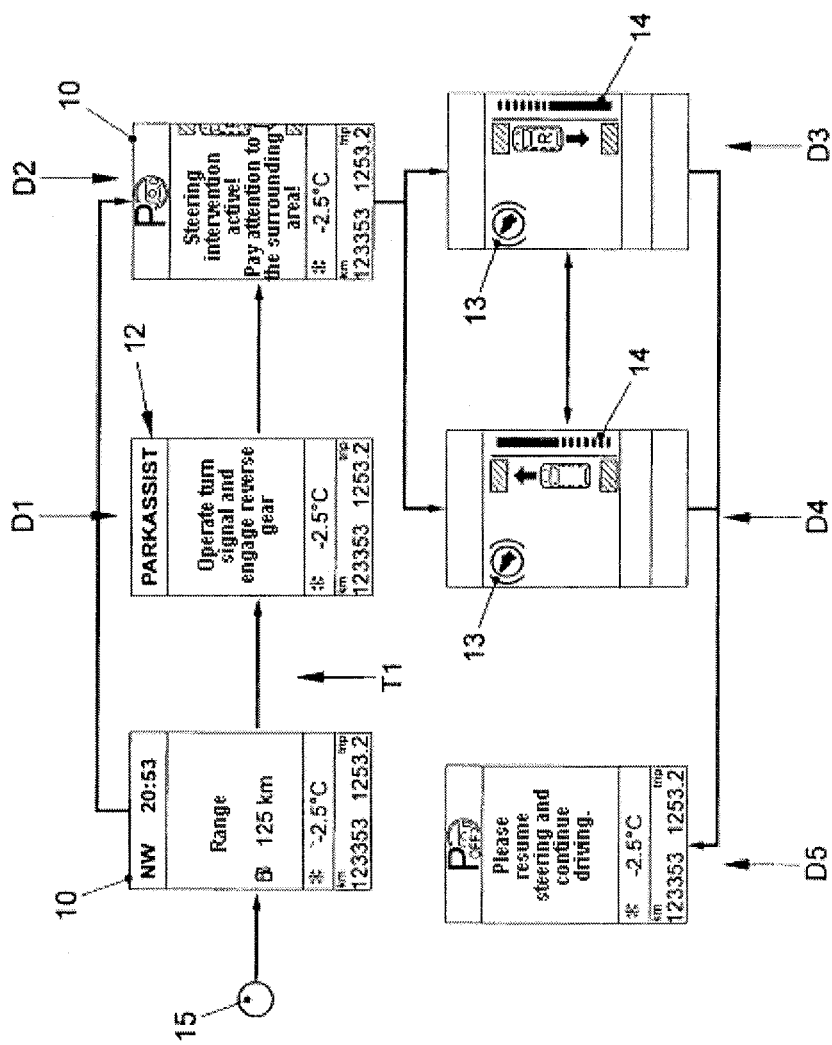
FIG. 6 is an illustration of the sequence of a multiple-maneuver process for driving out of a parallel parking space.

FIG. 6 shows the sequence for function D "driving out of a parallel parking space" in detail with reference to steps D1 to D5. After the ignition 15 is switched on, that is to say terminal 15=on, the standard information for the driver, that is to say range information, external temperature and kilometer reading of the vehicle and distance covered since the last time the vehicle was refueled etc., appears on the display unit 10.

A first operation T1 of the parking steering assistant button leads to a check to determine whether the vehicle has covered a predefined distance since the ignition was switched on. If this is not the case, that is to say the distance traveled s≤threshold a, the parking assistant automatically selects the second group of functions "driving out of a parking space" and the driver is requested to engage the reverse gear and to operate the turn signal in a first step D1. Furthermore, the information "Park Assist" is shown in order to display the system state to the driver. Once the driver has operated the turn signal and engaged the reverse gear, the function for driving out of a parking space is activated in the second step D2 and this is indicated to the driver on the display unit 10 by means of "Steering intervention active! Pay attention to the surrounding area" and the driver is requested to pay attention to the surrounding area. Depending on the starting position of the vehicle in the parallel parking space, the assistance system moves to step D3 or D4, so that the vehicle is maneuvered into a position within the parallel parking space which is expedient for driving out of the parking space. The progress of the process is illustrated by means of a bar graph 14 on the display unit 10, with the driver further possibly also being requested to apply the brake by means of the braking foot symbol 13. In this case, the third step D3 corresponds to a reverse movement and step D4 corresponds to a forward movement with a corresponding gear selection. If the assisted process for driving out of a parking space is terminated, the driver is requested to resume steering and continue driving in the fifth step D5.

The sequence of functions A and E corresponds substantially to function B and, respectively, D and therefore separate explanation is not necessary.

Figure 7:
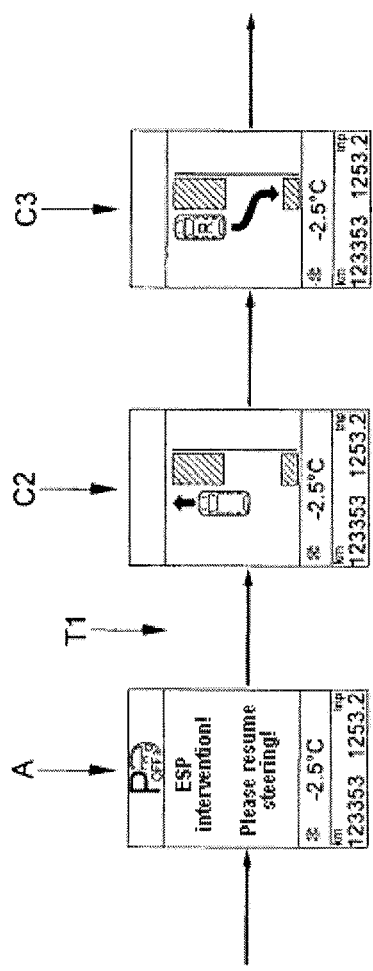
FIG. 7 is an illustration of resuming a function for driving into a parking space after it has been interrupted.
Figure 8:
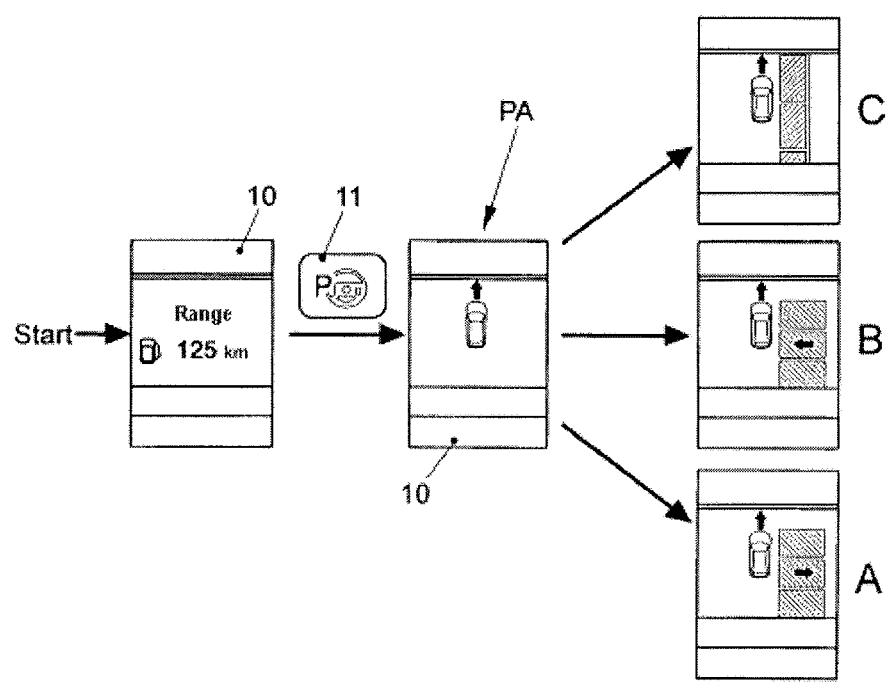
FIG. 8 is a schematic illustration of the sequence for automatically selecting the functions of the first group of functions (driving into a parking space using an HMI)

FIG. 7 shows how a function for driving into a parking space is resumed after the function is interrupted. If, for example, an ESP (Electrical Stability Program) was activated during the execution of the beginning of function C for driving into a parking space, this leads to an interruption of a function for driving into a parking space, this being indicated in step A and the driver being requested to resume steering. An operation T1 of the parking steering assistant button restores the system again and function C for driving into a parking space is selected with the first step C1 of the function C2 for driving into a parking space being shown. After a suitable position for driving into a parking space is reached, this is indicated in step C3 and the process for driving into a parking space, as described in FIG. 4, is continued FIG. 8 shows the automatic sequence for selecting functions A, B and C for driving into a parking space which are illustrated in FIG. 1 for the case in which a distance s which is greater than a predefined threshold a has been covered after the ignition switch state "on". At the beginning, which is identified in FIG. 8 by "Start", the parking steering assistance means is in the inactive state. Therefore, only general information is displayed on the display unit 10, such as, in the present example, the range of 125 km remaining until the next refueling stop. Operation of the parking steering assistant button 11 moves the system to the parking assistance mode PA and the display unit 10 indicates a symbol which displays the parking assistance mode. The area surrounding the motor vehicle is sensed, available parking spaces are searched for and the parking spaces are classified into parallel parking spaces or bay parking spaces by the surrounding area sensor system, for example ultrasound, radar and/or video camera, present in or on the motor vehicle. The parking assistance system automatically selects the function A, B or C for driving into a parking space on the basis of the identified type of parking space and possibly further information, for example the orientation of the vehicle in relation to the parking space, width of the carriageway, space for maneuvering etc., which can likewise be detected by means of the surrounding area sensor system. All that remains for the driver to do in order to activate the selected function for driving into a parking space is, for example, to engage the reverse gear and to monitor the sequence of the function for driving into a parking space and to follow the instructions for the corresponding function for driving into a parking space. It is of course possible for the driver to not follow the automatic proposal made by the parking steering assistant, but rather to overrule the proposal made by the parking steering assistant and call up other parking assistance functions by further operating the parking steering assistant button 11.

Figure 9:
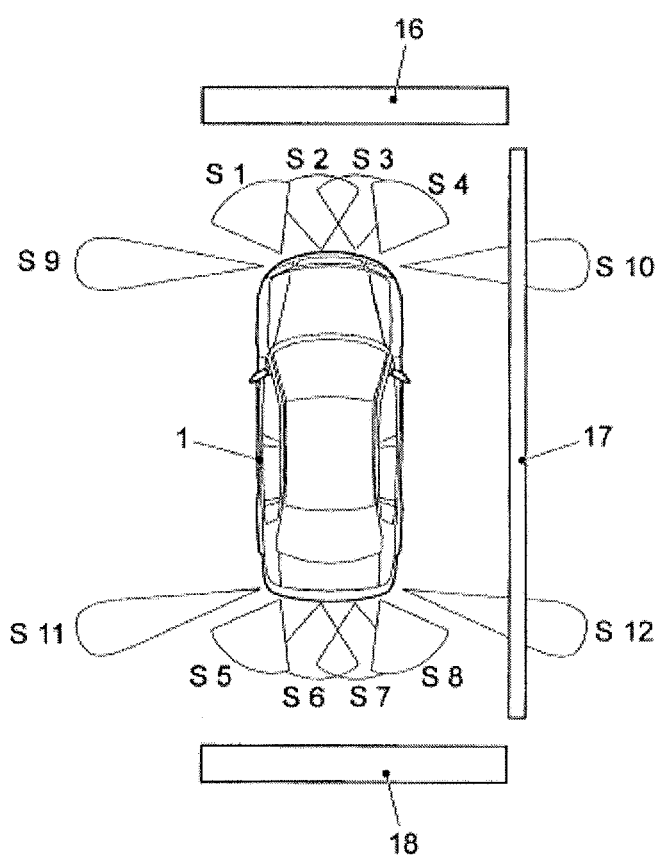
FIG. 9 shows the situation of a vehicle in a parallel parking space.

FIG. 9 is a schematic illustration of the situation of a vehicle 1 parked in a parallel parking space. The vehicle is equipped with a large number of surrounding area sensors, specifically front sensors S1 to S4 for sensing the area surrounding the front of the motor vehicle, rear sensors S5 to S8 for observing the area surrounding the rear of the motor vehicle, lateral left-hand-side sensors S9, S11 for observing the area surrounding the lateral left-hand side of the motor vehicle, and lateral right-hand-side sensors S10, S12 for observing the area surrounding the lateral right-hand side of the motor vehicle 1. If the described vehicle 1 and its sensors are in a parallel parking space, no distance or a distance of less than or equal to a predefined threshold has been covered since the ignition was switched on, and the driver operates the parking steering assistant button 11 described, for example, in FIG. 8, the sensors, in the example in FIG. 9, measure distances to the obstacles or boundaries 16, 17 and 18. Only sensors S9 and S11 do not measure distances, that is to say do not detect any obstacles. From the results, the parking steering system ascertains a parallel parking space with a direction for driving out of the parking space to the right-hand side and automatically provides the driver with function D for driving out of a parallel parking space.

Figure 10:
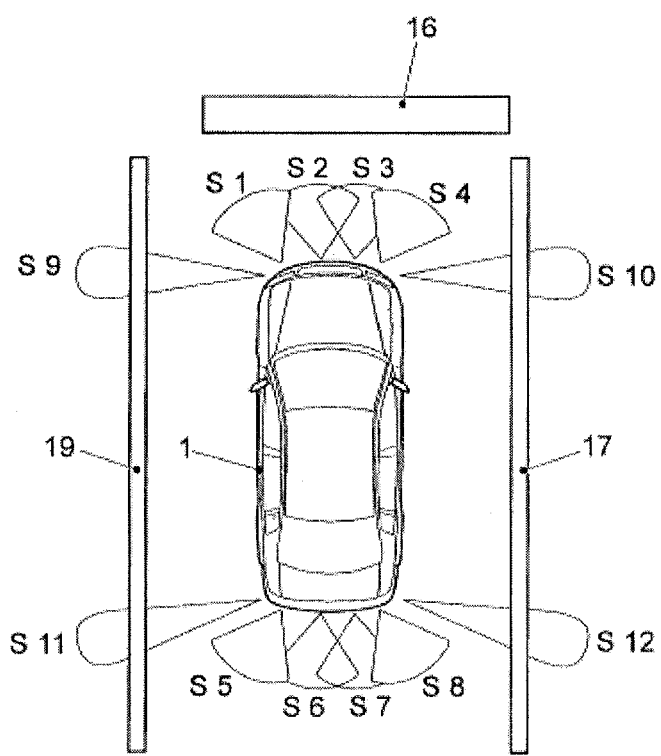
FIG. 10 shows the situation of a vehicle in a bay parking space.

FIG. 10, similarly to FIG. 9, shows a vehicle 1 in question parked in a bay parking space which has boundaries 16, 17 and 19. Measurements by the surrounding area sensors S1 to S12 in this case show that the sensors S1 to S4 and S9 to S12 detect the boundaries 16, 17 and 19, while the sensors S5 to S8 do not measure a distance. Consequently, program E for driving out of a parking space is automatically provided to the driver assuming that no distance s or at most a distance s of less than or equal to a predefined threshold a has been covered, that is to say s≤a, since the ignition was switched on, that is to say terminal 15=on. Engaging the reverse gear activates function E "driving out of a bay parking space" and the direction in which the vehicle reverses out of the parking space is established by means of operation of the direction indicator by the driver.

LIST OF REFERENCE SYMBOLS

EP Group of functions "driving into a parking space"
AP Group of functions "driving out of a parking space"
A Function "driving forward into a bay parking space"
B Function "reversing into a bay parking space"
C Function "reversing into a parallel parking space"
D Function "driving out of a parallel parking space"
E Function "reversing out of a bay parking space"
1 Vehicle in question
2 Vehicle
3 Vehicle
4 Bay parking space
5 Path
6 Curb
7 Sensor system
8 Parallel parking space
9 Directions for driving out of a parking space
10 Display
11 Parking steering assistant button
12 Parking assistant display
13 Braking foot symbol
14 Progress of the parking maneuver
15 Terminal 15 (ignition on)
16 Boundary
17 Boundary
18 Boundary
19 Boundary
B1 Step 1 of parking function B
B2 Step 2 of parking function B
B3 Step 3 of parking function B
B4 Step 4 of parking function B
B5 Step 5 of parking function B
B6 Step 6 of parking function B
B7 Step 7 of parking function B
C1 Step 1 of parking function C
C2 Step 2 of parking function C
C3 Step 3 of parking function C
C4 Step 4 of parking function C
C5 Step 5 of parking function C
C6 Step 6 of parking function C
C7 Step 7 of parking function C
D1 Step 1 of parking function D
D2 Step 2 of parking function D
D3 Step 3 of parking function D
D4 Step 4 of parking function D
D5 Step 5 of parking function D
PA Parking assistance mode
S1 Sensor
S2 Sensor
S3 Sensor
S4 Sensor
S5 Sensor
S6 Sensor
S7 Sensor
S8 Sensor
S9 Sensor
S10 Sensor
S11 Sensor
S12 Sensor
Start Beginning of the HMI cycle
T1 First button operation
T2 Second button operation
T3 Third button operation
T4 Fourth button operation

The invention claimed is:

1. A method for selecting a parking assistance function from amongst a predefined plurality of parking assistance functions provided by a parking steering assistant of a motor vehicle the method comprising:
displaying the parking assistance functions in a plurality of groups, with a first group comprising functions that relate to the vehicle driving into a parking space and a second group comprising functions that relate to the vehicle driving out of a parking space; and receiving user input of the parking assistance function via one or more input elements of the parking steering assistant, wherein the motor vehicle has a sensor system for determining an area surrounding the motor vehicle and a selection is made between the first and second group of functions based on an ignition switch state of the motor vehicle and the distance covered by the motor vehicle.

2. The method of claim 1, wherein:

the first group of functions is selected if the ignition switch is in an "on" state and the distance covered is greater than a predefined threshold after the ignition switch state becomes "on", and the second group of functions is selected when the ignition switch is in the "on" state and a distance covered is less than or equal to the predefined threshold after the ignition switch state becomes "on".

3. The method of claim 2, wherein, after one of the groups of functions has been selected, the parking assistance functions of the selected group can be selected by a user in a predefined order using the input element.

4. The method of claim 2, further comprising determining and classifying parking spaces in the area surrounding the motor vehicle into parallel parking spaces and bay parking spaces, and selecting a parking assistance function from amongst the selected group of functions of the parking assistance functions based on the classified parking space.

5. The method of claim 4, wherein a direction of driving into a parking space or driving out of a parking space is determined based on the classified parking space and/or is established by the driving direction indicator.

6. The method of claim 2, wherein the first group of functions comprises functions of driving forward into a bay parking space, reversing into a bay parking space and reversing into a parallel parking space, and the second group of functions comprises the functions of driving out of a parallel parking space and driving out of a bay parking space.

7. The method of claim 2, wherein a current driver assistance function and subsequently the execution of a selected driver assistance function are symbolically displayed on a display unit.

8. The method of claim 1, wherein, after one of the groups of functions has been selected, the parking assistance functions of the selected group can be selected by a user in a predefined order using the input element.

9. The method of claim 1, a direction of driving into a parking space or driving out of a parking space is established by a driving direction indicator coupled to the parking steering assistant.

10. The method of claim 1, further comprising determining and classifying parking spaces, in the area surrounding the motor vehicle into parallel parking spaces and bay parking spaces, and selecting a parking assistance function from amongst the selected group of functions of the parking assistance functions based on the classified parking space.

11. The method of claim 10, wherein a direction of driving into a parking space or driving out of a parking space is determined based on the classified parking space and/or is established by the driving direction indicator.

12. The method of claim 1, wherein the first group of functions comprises functions of driving forward into a bay parking space, reversing into a bay parking space and reversing into a parallel parking space, and the second group of functions comprises the functions of driving out of a parallel parking space and driving out of a bay parking space.

13. The method of claim 1, wherein a current driver assistance function and subsequently the execution of a selected driver assistance function are symbolically displayed on a display unit.

14. A parking steering assistant of a motor vehicle for selecting amongst and performing a predefined plurality of parking assistance functions provided by the parking steering assistant of a motor vehicle, the system comprising:

a surrounding area sensor system that determines an area surrounding the motor vehicle;

an evaluation unit determines parking spaces in the area surrounding the motor vehicle;

a control unit that controls the parking assistance functions with respect to driving into a parking space and driving out of a parking space;

at least one input element that activates the parking steering assistant and selects one of its functions and a selection device which makes a selection between a plurality of groups of functions of the parking steering assistant as a function of an ignition switch state and a distance covered by the motor vehicle, wherein a first group of functions relates to functions for driving into a parking space and a second group of functions relates to functions for driving out of a parking space.

15. The parking steering assistant of claim 14, wherein the selection device selects the first group of functions when the ignition switch is in an "on" state and a distance covered is greater than a predefined threshold after the ignition switch state becomes "on", and wherein the second group of functions is selected when the ignition switch is in the "on" state and a distance covered is less than or equal to the predefined threshold after the ignition switch state becomes "on".

16. The parking steering assistant of claim 15, wherein the first group of functions comprises functions of driving forward into a bay parking space, reversing into a bay parking space and reversing into a parallel parking space, and the second group of functions comprises functions of driving out of a parallel parking space and driving out of a bay parking space.

17. The parking steering assistant of claim 16, wherein the evaluation unit determines and classifies the parking spaces in the area surrounding the motor vehicle and the selection unit selects a parking assistance function from amongst the selected group of functions based on the classified parking space.

18. The parking steering assistant of claim 14, wherein the first group of functions comprises functions of driving forward into a bay parking space, reversing into a bay parking space and reversing into a parallel parking space, and the second group of functions comprises functions of driving out of a parallel parking space and driving out of a bay parking space.

19. The parking steering assistant of claim 18, wherein the evaluation unit determines and classifies the parking spaces in the area surrounding the motor vehicle and the selection unit selects a parking assistance function from amongst the selected group of functions based on the classified parking space.

20. The parking steering assistant of claim 14, wherein the evaluation unit determines and classifies the parking spaces in the area surrounding the motor vehicle and the selection unit selects a parking assistance function from amongst the selected group of functions based on the classified parking space.

* * * * *